United States Patent [19]
Gautier et al.

[11] Patent Number: 5,094,080
[45] Date of Patent: Mar. 10, 1992

[54] DOUBLE BRAKE-BOOSTER AND MASTER CYLINDER ASSEMBLY WITH RELATIVELY MOVABLE POWER PISTONS

[75] Inventors: Jean-Pierre Gautier; Ulysse Verbo, both of Aulnay-Sous-Bois, France

[73] Assignee: Bendix Europe Services Techniques, Drancy, France

[21] Appl. No.: 632,233

[22] Filed: Dec. 20, 1990

[30] Foreign Application Priority Data

Dec. 22, 1989 [FR] France .................. 89 17043

[51] Int. Cl.⁵ .................. B60T 13/56; F15B 11/00
[52] U.S. Cl. .................. 60/547.1; 91/369.2; 91/511; 91/519; 91/521
[58] Field of Search .................. 60/533, 545, 547.1, 60/547.3, 548, 549, 550, 551, 552, 555, 560; 91/369.1, 369.2, 376 R, 508, 519, 532, 511, 521, 522, 525

[56] References Cited

U.S. PATENT DOCUMENTS

| | | | |
|---|---|---|---|
| 3,478,519 | 11/1969 | Eggstein | 91/376 R X |
| 3,559,532 | 2/1971 | MacDuff | 60/545 X |
| 4,494,445 | 1/1985 | Furuta et al. | 91/376 R X |
| 4,610,483 | 9/1986 | Matsumoto et al. | 91/519 X |
| 4,632,208 | 12/1986 | Takayama et al. | 180/271 |
| 4,932,727 | 6/1990 | Wagner | 60/547.1 X |
| 4,979,426 | 12/1990 | Schiel et al. | 91/369.1 |

FOREIGN PATENT DOCUMENTS

| | | | |
|---|---|---|---|
| 1505226 | 12/1967 | France | |
| 0163051 | 7/1986 | Japan | 91/369.2 |
| 0295767 | 12/1987 | Japan | 91/369.2 |

*Primary Examiner*—Edward K. Look
*Assistant Examiner*—John Ryznic
*Attorney, Agent, or Firm*—Larry J. Palguta; Ken C. Decker

[57] ABSTRACT

In the double brake-booster and master cylinder assembly, the booster comprises, in an outer casing 10, a fixed partition 11 defining, inside the casing 10, a front space A and a rear space B, each space A, B being divided in a sealed manner into a front chamber 12, 18 and a rear chamber 14, 20 by a movable partition 16, 22, at least one elastic mechanism 31 tending to displace one 16 of the movable partitions 16, 22 rearward, at least one passage 38 connecting the two front chambers 12, 18, at least one passage 53 connecting the two rear chambers 14, 20, a pressure difference being established between the front 18 and rear 20 chambers of the rear space B by a valve mechanism 35 on actuation of a control rod 27 in order to actuate an output rod, the output rod actuating a piston of the master cylinder. The movable front and rear partitions 16, 22 are independent of one another and the passage connecting the two front chambers 12, 18 is formed in a cylindrical extension 30 of the piston 32 of the master cylinder.

7 Claims, 1 Drawing Sheet

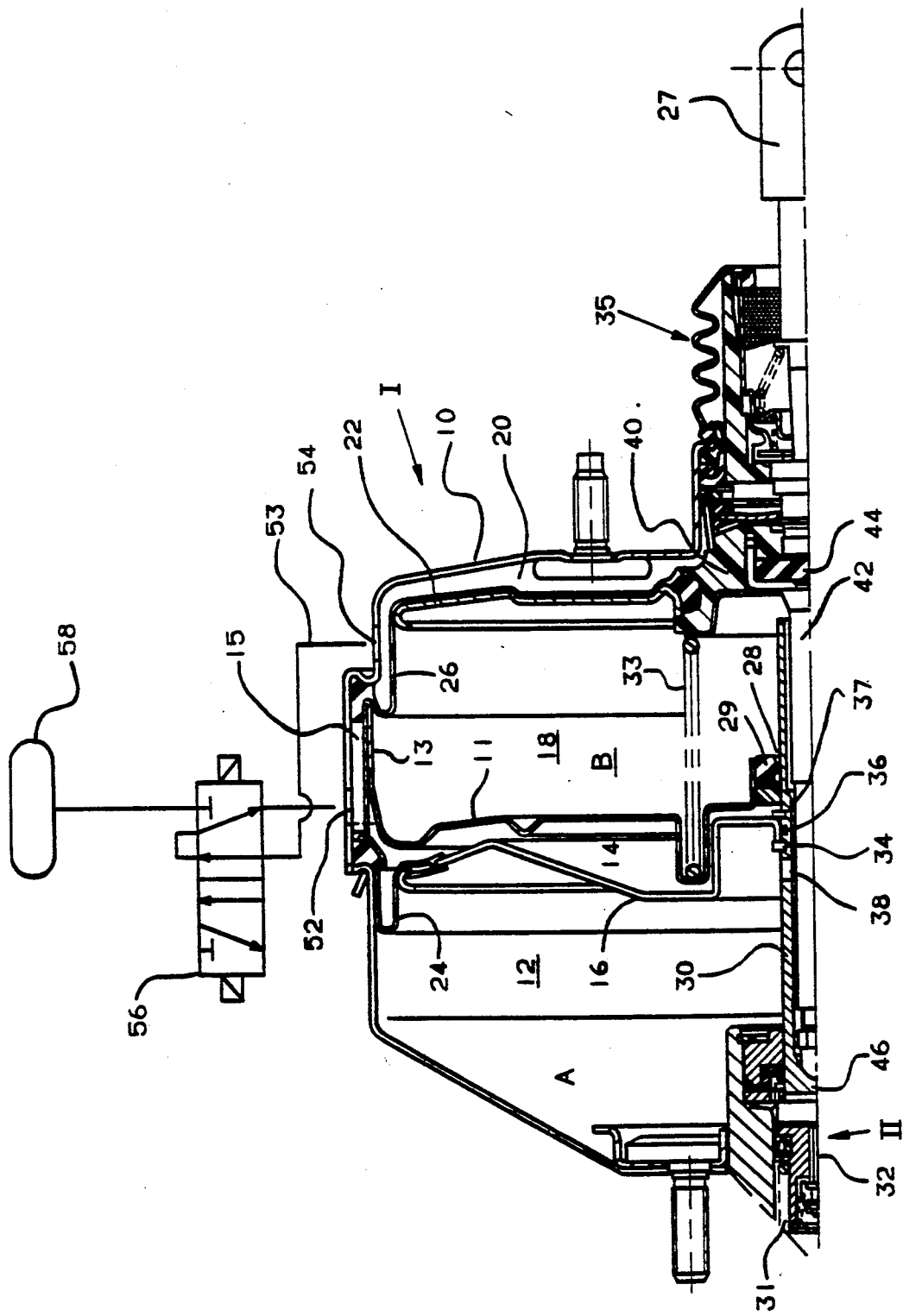

DOUBLE BRAKE-BOOSTER AND MASTER CYLINDER ASSEMBLY WITH RELATIVELY MOVABLE POWER PISTONS

BACKGROUND OF THE INVENTION

The present invention relates to pressure-emitting assemblies for hydraulic brake circuits, used in motor vehicles, and more particularly to those which consist of a double, also called tandem, booster and a master cyclinder.

Assemblies of this type are well-known in brake engineering. In a conventional manner, the double booster comprises, in an outer casing, a fixed partition defining, inside this casing, a front space and a rear space, each space being divided in a sealed manner into a front chamber and a rear chamber by a movable partition, at least one elastic means tending to displace a movable partition rearward, at least one passage connecting the two front chambers and at least one passage connecting the two rear chambers, a pressure difference being established between the front and rear chambers of the rear space by a valve means on actuation of a control rod in order to actuate an output rod. This output rod actuates in turn the piston of a master cylinder, which produces a rise in pressure in at least one hydraulic brake circuit.

Assemblies of this type are arranged in a conventional manner in the engine compartment of the vehicle, where the space available is becoming less and less as manufacturers attempt to arrange an increasing number of accessories while observing the streamlining of the engine hood.

Manufacturers therefore tend to try and incorporate different systems into one, while observing the safety standards of course.

In addition, there are various situations where it is desirable to create an increase in pressure in the brake circuit without the control of the driver of the vehicle, such as, for example, to prevent the wheels from spinning on starting, to act as an antitheft device, and for hill starts, etc...

The known systems for the prevention of spinning on starting comprise driving-wheel speed sensors connected to a computer. When the computer detects a tendency of the wheels to spin, a known technique consists in controlling the braking of the driving wheels as in FR-A-2,513,201. This solution leads to extremely complex, fragile, bulky and expensive embodiments. Moreover, during the periods of antispin operation, the actuation of the brakes causes the brake pedal to be depressed, which may surprise the driver since, if he wishes to brake during these periods, his foot will not find the brake pedal in its usual place.

The known antitheft systems act on various control or operating members of the vehicle, and are always elements which are added to the engine compartment. Some of them actuate the brakes if the vehicle is occupied by an unauthorized driver, and are again complex, bulky and expensive systems.

By way of an aid to driving, manufacturers have also developed systems providing assistance with hill starts. These systems keep the brakes applied until the accelerator pedal is actuated. These systems are a further addition to the above and have the same disadvantages.

SUMMARY OF THE INVENTION

It is therefore an object of the present invention to provide a double brake-booster and master cylinder assembly which enables a braking function to be performed without the driver acting on the brake pedal and without reaction on this pedal, and which is of simple, robust, reliable and compact design.

According to the invention, this result is achieved by means of an assembly of the type mentioned above, in which the movable front and rear partitions are independent of one another and in which the passage connecting the two front chambers is formed in a cylindrical extension of the piston of the master cylinder. In a preferred embodiment, this cylindrical extension ensures sealing between the rear chamber of the front space and the front chamber of the rear space. Advantageously, means are provided in order to establish a pressure difference between the rear chamber of the front space and the rear chamber of the rear space. Preferably, these means consist of an electrovalve arranged in the passage connecting the two rear chambers.

By virtue of this arrangement, the pressures in the rear chambers may be different, and therefore the movable partitions may have different movements, the movement of the single movable front partition not necessitating the movement of the booster control rod. Moreover, since communication between the front chambers and sealing between the two spaces are ensured by the cylindrical extension of the piston of the master cylinder, this arrangement enables the booster-master cylinder assembly to be made compact.

BRIEF DESCRIPTION OF THE DRAWING

The invention will now be described by way of example with reference to the accompanying drawing in which:

the single FIGURE shows diagrammatically in half-section a double brake-booster and master cylinder assembly constructed according to the present invention.

DETAILED DESCRIPTION OF THE INVENTION

With reference to the single figure, the assembly shown comprises a booster I associated with a master cylinder II.

The double booster I comprises, in a conventional manner, an outer casing 10, the interior of which is divided by a fixed partition 11 into a front space A and a rear space B.

By convention, "front" is used for the direction in which the parts are displaced when they are actuated and "rear" for the direction in which the parts are displaced in order to return to their rest position. Thus, in the FIGURE, the front is situated to the left and the rear is situated to the right.

The front space A is divided into a front chamber 12 and a rear chamber 14 by a movable wall 16. Similarly, the rear space B is divided into a front chamber 18 and a rear chamber 20 by a movable wall 22. Each movable wall 16, 22 is provided with a membrane 24, 26 respectively, the outer peripheral edge of which is fastened in a sealed manner to the outer casing 10 in order to separate in a sealed manner the front chambers 12, 18 from the rear chambers 14, 20 of each space.

In a conventional manner, the front chambers of each space communicate with one another and are connected to a vacuum source. Likewise in a conventional manner, the fixed partition 11 comprises a cylindrical extension 13 permitting the definition, with the outer casing 10, of a peripheral annular chamber 15 which, in a prior construction such as illustrated in U.S. Pat. No. 4,516,474, would put the two rear chambers 14 and 20 in communication by virtue of slots or openings (not illustrated or present herein) formed in the outer peripheral rim of the membrane 26, the rear chamber 14 of the prior construction communicating with the annular chamber 15. In such a prior construction and upon the actuation of the input rod 27 connected to a brake pedal (not shown), valve means 35 interrupt the communication between the front chambers and the rear chambers and allow air at atmospheric pressure to enter the rear chambers 14 and 20, which produces a pressure difference on the movable walls 16 and 22 which then move forward counter to the action of the return spring 31 and provide the required assistance in the actuation of the master cylinder II.

According to the invention, when it is desired to actuate the brakes of the vehicle without this actuation originating from the depression of the brake pedal, and without the actuation causing this depression of the brake pedal, and to do so in order to perform, for example, the antispin function on starting, the antitheft function or as an aid on hill starts, it is envisaged to make the movable front 16 and rear 22 partitions independent of one another.

In the embodiment shown in the FIGURE, the fixed partition 11 has a central opening 28 in which a cylindrical extension 30 of the piston 32 of the master cylinder II slides in a sealed manner by virtue of a seal 29. The movable partition 16 is fastened in a sealed manner on the extension 30 by virtue of two locking rings 34, 37 and a seal 36. On account of the sealed sliding of the extension 30 in the fixed wall 11, and on account of the movable partition of the front space A being secured to the cylindrical extension 30 of the piston 32, this extension 30 also ensures the separation between the rear chamber 14 of the front space A and the front chamber 18 of the rear space B. Consequently, advantageously by virtue of the invention, the passage connecting the two front chambers 12 and 18 is constructed in a very simple manner by means of an opening 38 formed in the cylindrical extension 30, putting the chamber 12 in communication with the interior of this extension 30 which itself emerges in the chamber 18.

The movable partition 22 of the rear space is conventional and forms the skirt of the piston 40 actuated by the valve means 35, and actuating an output rod 42 via a reaction disk 44. The output rod 42 penetrates, with play, into the cylindrical extension 30 and, in the rest position shown, abuts against the base 46 of the extension 30.

The movable rear partition 22 is returned to the rest position by a spring 33 which bears on the rear face of the fixed partition 11. Advantageously by virtue of the invention, it is not necessary to provide a return spring for the movable front partition 16 since the latter, being secured to the rear cylindrical extension 30 of the piston 32 of the master cylinder II, is already returned to the rest position by the return spring 31 of the piston 32.

Since the output rod 42 abuts against the base 46 of the extension 30, the actuation of the booster I by the input rod 27 causes the simultaneous movement of the movable partitions 22 and 16 and the actuation of the master cylinder II, in an identical manner to that of a conventional double booster.

In contrast, when it is desired to produce a braking action without the involvement of the input rod 27, by virtue of the play existing between the rod 42 and the cylindrical part 30, the forward movement of the movable front wall 16 will permit the actuation of the piston 32 of the master cylinder, without being transmitted to the rod 42 and therefore to the rod 27.

According to the invention, the single movable front wall 16 is moved forward in the following manner. The outer peripheral rim of the membrane 26 is constructed in a continuous manner, that is to say it is without any traditional opening or slot described for the prior construction. Under these conditions, the rear chambers 14 and 20 are no longer able to communicate via the annular chamber 15. According to the invention, the passage connecting the two rear chambers is obtained by a communication 53 established between an opening 52 constructed in the outer casing 10 and emerging in the annular chamber 15, which communicates with the rear chamber 14 via radial opening 13A, and an opening 54 likewise constructed in the outer casing 10 and emerging in the rear chamber 20.

Interposed in the communication 53 between these openings 52 and 54 is a three-way and two-position electrovalve 56. In the rest position shown, the electrovalve 56 permits communication between the two rear chambers 14 and 20, and therefore conventional operation of the booster as described above.

In contrast, when a braking action is required without the control of the driver, a computer (not shown) controls the passage of the electrovalve 56 into its second position, in which the communication between the rear chambers 14 and 20 is interrupted, and in which the rear chamber 14 of the front space is connected to a source of air at atmospheric pressure 58. Since there is a permanent reduced pressure in the front chamber 12, the movable wall 16 is subjected to a differential pressure which causes it to move forward, as well as the piston 32 of the master cylinder, which produces the required braking action, while the play existing between the cylindrical extension 30 and the rod 42 means that the latter is not carried along in this movement, and the rod 27 neither.

An assembly consisting of a double brake-booster and a master cylinder has thus been constructed in a simple manner, this assembly being capable of producing a braking action independently of pressure upon the brake pedal, and without moving this brake pedal, and being able to be used for various functions such as antispin on starting, antitheft and as an aid on hill starts.

Although only one embodiment has been described, numerous modifications could be made by a person skilled in the art without departing from the scope of the present invention. For example, it is possible to use air or another gas under pressure instead of atmospheric pressure. Similarly, the front and rear spaces are not required to have the same diameter.

What we claim is:

1. A double brake-booster and master cylinder assembly, the booster comprising, in an outer casing, a fixed partition defining, inside the casing, a front space and a rear space, each space being divided in a sealed manner into a front chamber and a rear chamber by a movable partition, at least one elastic means tending to displace rearwardly one of the movable partitions, at least one passage connecting the two front chambers, at least one passage with means for connecting selectively the two rear chambers, a pressure difference being established between the front and rear chambers of the rear space by valve means upon actuation of a control rod in order to actuate an output rod, the output rod actuating a piston of a master cylinder, one of the movable front and rear partitions being movable independently and relative to the other of the partitions, the passage connecting the two front chambers being formed in a cylindrical extension of the piston of the master cylinder, and the cylindrical extension of the master cylinder ensuring sealing between the rear chamber of the front space and the front chamber of the rear space.

2. The assembly according to claim 1, wherein the means for connecting selectively the two rear chambers establishes a pressure difference between the rear chamber of the front space and the rear chamber of the rear space.

3. The assembly according to claim 2, wherein the means for connecting selectively the two rear chambers comprises an electrovalve arranged in the passage connecting the two rear chambers.

4. The assembly according to claim 3, wherein the electrovalve is a three-way, two-position electrovalve.

5. The assembly according to claim 4, wherein, in one position, the electrovalve permits communication between the two rear chambers and, in another position, interrupts communication between the two rear chambers and connects the rear chamber of the front space to a source of air at atmospheric pressure.

6. The assembly according to claim 1, wherein the movable partition of a front space is secured to the piston of the master cylinder.

7. The assembly according to claim 1, wherein the elastic means tending to displace rearwardly the movable partition of the front space is situated in the master cylinder.

* * * * *